July 4, 1950

L. HORNBOSTEL 2,514,240

DIFFERENTIAL DRIVE

Filed May 27, 1946

Inventor
LLOYD HORNBOSTEL

July 4, 1950 L. HORNBOSTEL 2,514,240
DIFFERENTIAL DRIVE
Filed May 27, 1946 5 Sheets-Sheet 3

Inventor
LLOYD HORNBOSTEL

July 4, 1950  L. HORNBOSTEL  2,514,240
DIFFERENTIAL DRIVE
Filed May 27, 1946  5 Sheets-Sheet 4
Fig. 5.
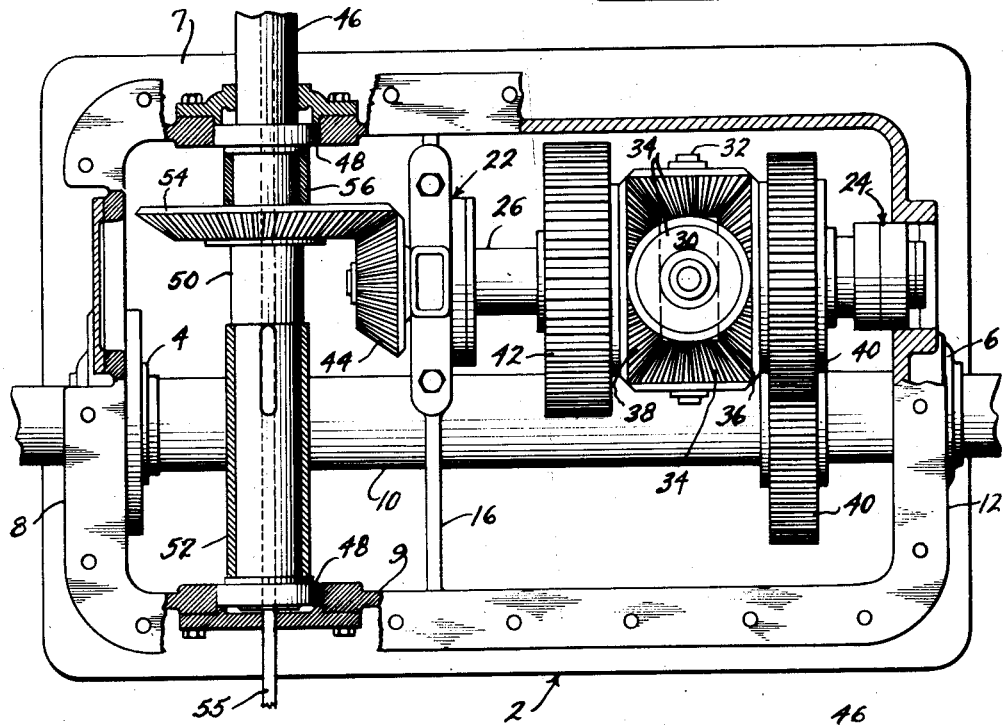
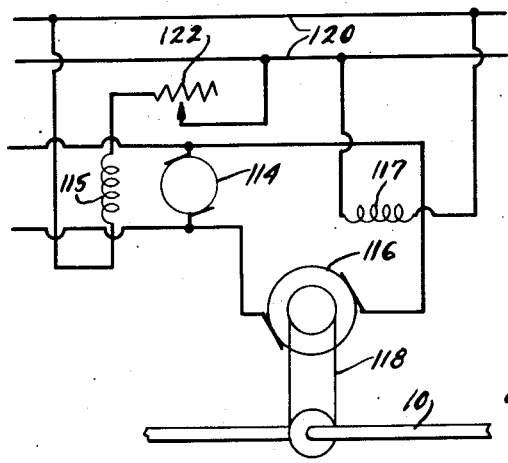
Fig. 9
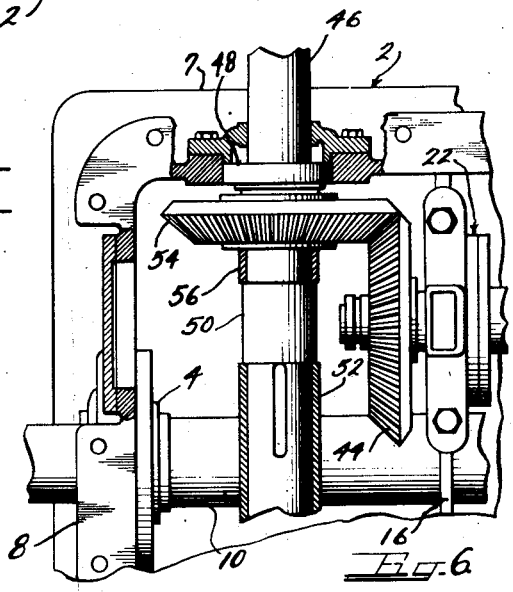
Fig. 6
Inventor
LLOYD HORNBOSTEL
by  Attys.

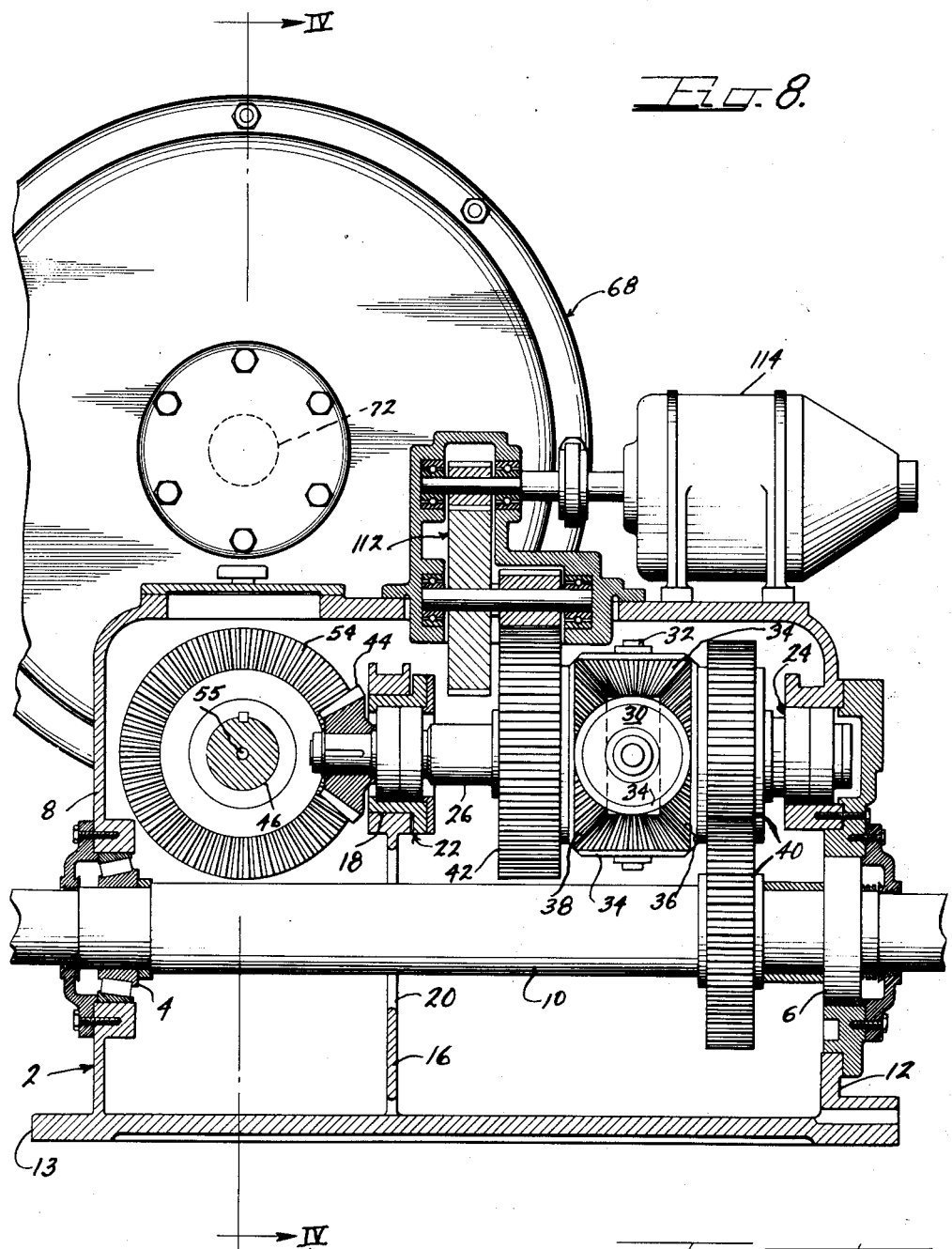

Patented July 4, 1950

2,514,240

UNITED STATES PATENT OFFICE 2,514,240

DIFFERENTIAL DRIVE

Lloyd Hornbostel, Beloit, Wis., assignor to Beloit Iron Works, Beloit, Wis., a corporation of Wisconsin Application May 27, 1946, Serial No. 672,473

3 Claims. (Cl. 74—675)

This invention relates to drive units for machines whereby various rotating sections of a machine can be driven at different speeds from a single prime mover. Specifically, the invention relates to a drive for paper making machines.

Transmission of power from a prime mover to a paper making machine requires installations which provide means for altering the relative speeds of the various sections of a machine to accommodate the variations of expansion and contraction of paper passing through the machine for insuring the necessary "draw" between one section and another, as well as to provide for the speeding up of paper machine rolls which have been reduced in diameter from their original sizes by regrinding and buffing operations. Heretofore, slight differences in speeds of the various sections of the machine have been accomplished by the use of adjustable pulleys and belt drives from a single line shaft for driving right angle gear units, which units drive the inshafts to the machine sections. Such adjustable pulley and belt drives require appreciable space, involve the use of many bearings and require belts which must be continuously replaced.

In accordance with this invention, the transmission of power from a main line shaft to any one of the rotating sections of a paper making machine is accomplished without requiring adjustable pulley and belt arrangements for transmitting a majority of the power. Apparatus in accordance with this invention also eliminates the necessity for separate right angle gear units.

In my prior Patent No. 2,392,149, dated January 1, 1946, there is disclosed and claimed a mechanical drive for paper making machines wherein a small, compact mechanical drive unit positioned at each section of the paper making machine receives a main line shaft therethrough and transmits power from the line shaft to the machine section at the desired speed and in the desired direction. Such unit included a swing gear inshaft drive arrangement accommodating differences in levels of various inshafts of the rotating sections of the machine so the direct coupling between the rotating section inshaft and the driving shaft of these units is possible even when the inshafts are at different levels for each of the various sections of the machine. The apparatus disclosed in my above-referred-to patent also includes a symmetrical differential drive having one side driven at substantially the same speed as the line shaft, and the other side driven at a slow speed. This differential drive acts both as a speed reducer and a power transmitter capable of being readily controlled by a speed changer to deliver power at the desired speed. The differential drive eliminates the necessity for a complicated multigear layout and makes possible the use of small and compact parts.

This invention provides certain improvements over the apparatus disclosed in my prior patent. In accordance with this invention, the main drive shaft structure is greatly simplified and in effect reduced to a simple shaft-like member primarily due to the location of the clutch on the low speed side of the mechanical drive unit. In accordance with this invention, a symmetrical differential drive is again utilized having one side driven directly from the line shaft at approximately the same speed as the line shaft and the other side driven at a low speed by a speed controlled device. In one modification of this invention such speed controlled device constitutes a speed reducer which is driven by the main line shaft. In a further modification of this invention, the speed controlled device constitutes an electric motor which is energized by a voltage generated in turn by a generator driven by the line shaft and subject to manual control by means of a variable resistor in the field circuit of the motor. In both modifications, the output or driven shaft of the differential is coupled through suitable gearing to a power transfer shaft which projects out of the housing which accommodates the differential drive. The speed at which this power transfer shaft rotates is selected to lie in the range of optimum clutch performance for the particular power requirements of the rotating section of the machine which is to be driven. This invention therefore permits a conventional fluid-actuated clutch of small size to be mounted on the projecting end of the power transfer shaft to couple such shaft to the input shaft of a swing gear unit connecting with the inshaft of the rotating section.

In the apparatus embodying this invention, the swing gear unit is pivotally supported on a separate frame member disposed adjacent the rotating section of the paper making machine. The pivotal casing of the swing gear unit carrying the power output shaft is positioned at the proper height to align with the inshaft of the rotating section of the paper making machine by means of a standard.

A further feature of this invention is the positioning of the power transfer shaft relative to the driven shaft of the differential drive in such manner that a single bevel gear on the power transfer shaft may be axially moved on the shaft to respectively cooperate with any one of a plurality of bevel gears of varying sizes selectively carried by the driven shaft of the differential drive. Such an arrangement permits a single differential drive unit to be readily adapted for application to any rotating section of any paper making machine inasmuch as the range of speed of the power transfer shaft may be readily varied by changing the single gear on the driven shaft of the differential drive.

Accordingly, it is an object of this invention to provide a compact, efficient, mechanical drive unit particularly adapted for application to paper making machinery.

Another object of this invention is to provide an improved mechanical drive adapted to deliver power efficiently from a prime mover at adjustable levels to a driven member.

A further object of this invention is to provide a clutch controlled mechanical drive unit for a paper making machine adapted to receive a main line shaft therethrough and arranged so that the clutch is located in an exterior, readily accessible position and operated at an optimum speed for the particular power requirements which it is required to transmit.

A further object of this invention is to provide an improved, variable speed, mechanical drive unit including a differential for obtaining speed control of the output shaft wherein one side of the differential is driven by a speed controlled motor and accordingly the speed of the output of mechanical drive is determined by the speed of the motor.

A still further object of this invention is to provide an improved paper machine sectional drive unit having a swingable gear casing adapted to be positioned at the desired level for direct coupling of the delivery shaft of the unit with an inshaft of the paper machine.

Other and further objects of this invention will be apparent to those skilled in the art from the following detailed description of the annexed sheets of drawings which, by way of preferred example only, illustrate two embodiments of the invention.

On the drawings:

Figure 5 is a partial top plan view, partly in section, of the differential housing with the cover portions removed. In this figure the driven shaft of the differential drive unit is shown with a small bevel gear mounted thereon;

Figure 6 is a partial view of Figure 5 showing the arrangement of the gear elements when a large bevel gear is mounted on the driven shaft of the different drive unit;

Figure 7 is a reduced scale, sectional view of Figure 4 taken along the plane VII—VII thereof, showing the swing gear casing and standard therefor;

Figure 8 is a vertical sectional view taken through the differential drive housing and illustrating a second modification of this invention wherein the differential drive is controlled by an electric motor; and Figure 9 is a schematic circuit diagram illustrating the connections utilized in the modification of Figure 8.

As shown on the drawings:

Figure 1:
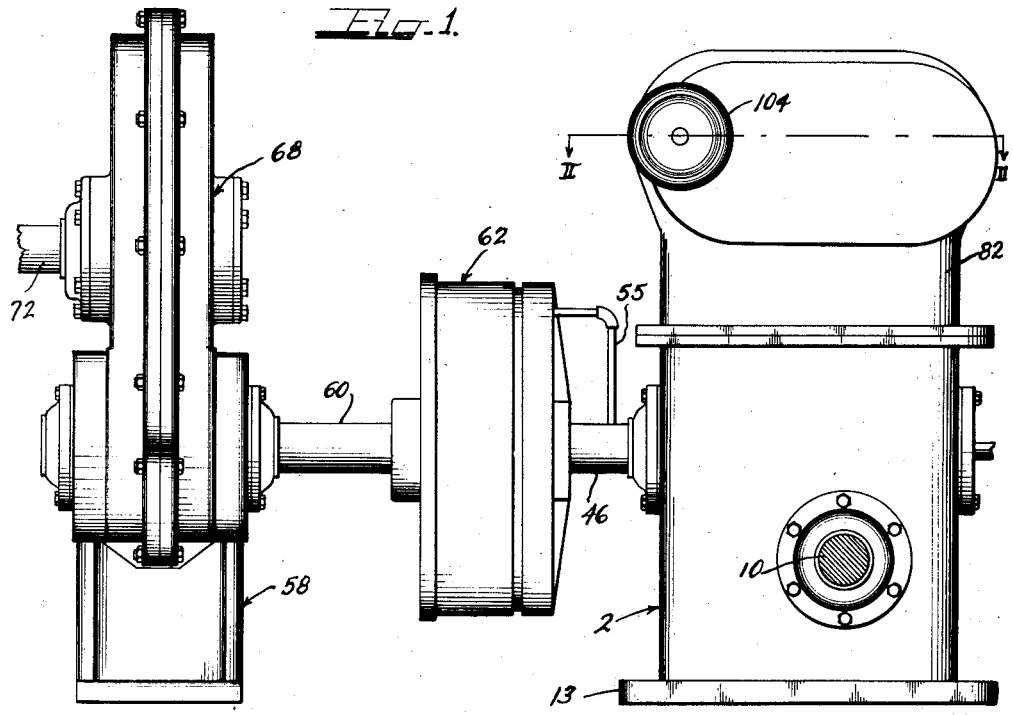
Figure 1 is an elevational view of the sectional drive unit of this invention, looking at the unit along the axis of the main drive shaft and illustrating the one modification wherein a mechanical speed changer is utilized to control the differential drive unit.

In both modifications of this invention which will be described in detail, the arrangement of the line shaft, differential drive housing, clutch and swing gear casing are identical. Accordingly, these common elements of the apparatus embodying this invention will be described first.

Referring to the drawings, a drive unit housing 2 is provided comprising a generally rectangular, box-like member which surrounds and journals a portion of a main line shaft 10, which, for purposes of example, may be considered to be the main line shaft utilized in any one of several well known forms of paper making machines. Line shaft 10 is journaled in suitable bearings 4 and 6 provided respectively in opposed side walls 8 and 12 of the housing 2.

The housing 2 has an external mounting flange 13 therearound for securing the unit on the floor, for example, on the rear side of a paper making machine. As best shown in Figures 5 and 8, the housing 2 has a vertical partition wall 16 therein with apertures 18 and 20 therethrough. Main line shaft 10 extends freely through aperture 20 and aperture 18 is utilized to mount a bearing 22. A similar bearing 24 is mounted in the side wall 8 of housing 2 in alignment with bearing 22 and the output or driven shaft 26 of a differential drive unit 30 is journaled in bearings 22 and 24. A differential spider 32 is keyed to the driven shaft 26 between the bearings 22 and 24 and has bevel gears 34 rotatably mounted around the end portions thereof on suitable bearings. A power input bevel gear 36 is rotatably mounted on the driven shaft 26 on one side of the spider 32 and a speed control input bevel gear 38 is rotatably mounted on shaft 26 on the other side of spider 32. Bevel gears 36 and 38 both mesh with the bevel gears 34 provided on the spider 32 and accordingly the bevel gears 36 and 38 constitute two driving sides of the differential unit 30 which supply power to the driven shaft 26.

One side of the differential unit 30, namely, bevel gear 36, is geared directly to the line shaft 10 by cooperating gears 40. The other side of the differential drive unit 30, namely, bevel gear 38, is secured to a gear 42 which, as will be later described, is driven by a speed control mechanism. It is therefore apparent, as set forth in detail in my above referred to prior patent, that the speed of the output or driven shaft 26 of the differential drive unit 30 is determined by the speed of the gear 42 which drives the one side of the differential unit. Furthermore, by suitable proportioning of the bevel gears 36 and 38 relative to bevel gears 34 and the spider 32, the differential unit 30 may be utilized to obtain a substantial speed reduction of the driven shaft 26 relative to the line shaft 10. In the particular example illustrated, the reduction is about two to one.

One end of the driven shaft 26 projects through the bearing 22 and on such projecting end a bevel gear 44 is mounted. In accordance with this invention, a universal application of the drive unit to various types and sections of paper machines may be conveniently accomplished by substituting smaller or larger diameter bevel gears 44 on the projecting end of driven shaft 26. In the construction illustrated in Figure 5, the bevel gear 44 is of small diameter; in the construction illustrated in Figure 6 a larger diameter bevel gear 44 is utilized. In either event, the bevel gear 44 transmits power to a power transfer shaft 46 which is journaled in suitable bearings 48 provided in opposed side walls 7 and 9 of the housing 2, thus mounting power transfer shaft 46 in a position substantially transverse to the line shaft 10, and in the particular example illustrated, at right angles to the line shaft 10.

Power transfer shaft 46 is provided with an enlarged diameter central portion 50 and a spacer sleeve 52 surrounds that portion of the shaft 46 lying on one side of the central portion 50 to locate the shaft relative to the side wall 9. On the other side of central portion 50 a bevel gear 54 is keyed to the shaft 46 but is axially movable thereon to permit such single gear 54 to engage either size of bevel gear 44 which might happen to be utilized on the projecting end of driven shaft 26. Suitable spacer sleeves 56 are provided which surround power transfer shaft 46 and one of which locates bevel gear 54 in proper axial position on shaft 46 relative to the particular size of bevel gear 44 with which it cooperates.

Power transfer shaft 46 is hollow and a fluid supply conduit 55 is mounted within the bore of shaft 46 for a purpose that will be described.

One end of power transfer shaft 46 projects through the side wall 7 of housing 2 which is adjacent to the paper making machine. A primary frame 58 is provided immediately adjacent the particular rotating section of the paper making machine to which the drive unit is to be connected and the frame 58 journals an input shaft 60 which is disposed in substantial alignment with the projecting end of power transfer shaft 46.

A fluid operated clutch 62 is utilized to couple the adjacent ends of input shaft 60 and power transfer shaft 46. Clutch 62 may comprise any one of several well known constructions and is supplied with actuating fluid by the fluid conduit pipe 55 which passes through the bore of transfer shaft 46. Since transfer shaft 46 is of relatively short length, the supply of fluid to the clutch 62 is accomplished very conveniently. This is in distinct contrast to drive units heretofore known wherein the fluid supply conduit was required to be mounted within the main line shaft, which, of course, is a member of very great length.

Input shaft 60 is supported by frame 58 but actually is journalled by bearings 64 which are mounted within the hollow bore portion 66 of a swing gear casing 68. Casing 68 is provided with a pair of spaced cylindrical hub portions 70 which pivotally mount such casing in the frame 58 for movement about a substantially horizontal axis. At a point in the swing gear casing 68 radially offset from the pivotal mounting of the casing, a power output shaft 72 is journaled in suitable bearings 74. Input shaft 60 is connected to output shaft 72 through suitable reduction gears 76 which are housed within the swing gear casing 68.

From the construction thus far described, it is apparent that the swing gear casing 68 may be pivoted about its pivotal mounting in the frame 58 to selectively position the output shaft 72 at the vertical location of the inshaft of the particular rotating section of the paper machine which the drive unit is to drive. The swing gear casing 68 may be rigidly retained in such selected pivotal position by means of a standard 76a (Figure 7) which provides vertical support for the swing gear casing 68 relative to the base of the frame 58. Obviously, standards 76a may be produced in varying height to permit the drive unit to be applied to any desired rotating section of a paper machine irrespective of the particular height of the inshaft.

It should be particularly noted that in a drive unit embodying this invention the clutch is located so as to operate at an intermediate speed, i. e., the clutch 62 operates at a substantially lower speed than the main line shaft 10 and yet at a substantially higher speed than the inshaft of the rotating section of the paper machine being driven. Ordinarily, sound engineering practice would dictate that the clutch be located in the high speed side of the drive mechanism where a small size clutch could be utilized, due to the fact that for any fixed horse power transmission requirement, the torque which the clutch is required to transmit is inversely proportional to the speed. However, in a paper making machine, a severe problem arises in overheating of clutches located in the high speed end of the drive mechanism due to the very great inertia forces which must be overcome in starting and bringing the rotating sections up to speed. On the other hand, if the clutch were located directly between the inshaft of the rotating section and the output shaft of the drive unit, then the torque which the clutch would be required to transmit during running conditions would be so large as to require an excessively large size clutch. In accordance with this invention, the clutch is located at an intermediate speed position in the driving unit and optimum clutch performance is thereby obtained due to the balancing of the heating factor against the size requirements of the clutch. In the particular example illustrated, the line shaft will operate at about 1000 R. P. M. The differential drive unit 30 will accomplish approximately a two to one speed reduction, subject of course to the variations in speed of the driven shaft 26 produced by the rotation of the speed control drive gear 42. If no further speed reduction is accomplished by the cooperating bevel gears 44 and 54, then the clutch 62 will operate in a speed range of from 400 to 450 R. P. M. In other applications, where a further reduction is accomplished by the cooperating bevel gears 44 and 54, the speed range of the clutch will be further reduced to permit operation of a clutch at from 200 to 250 R. P. M. In either event, such intermediate speed represents an optimum speed of operation for a clutch in a machine having the power requirements and inertia characteristics of the rotating sections of a paper making machine.

The apparatus thus far described is common to both modifications of this invention illustrated in the drawings. In the modification illustrated in Figures 1 through 3, the speed of the speed control drive gear 42 of the differential drive unit 30 is determined by a speed change unit 80. Speed change unit 80 may be conveniently mounted in a housing 82 which is in turn mounted on top of the main housing 2. Speed change unit housing 82 rotatably carries a shaft 84 and a second shaft 86 spaced from the shaft 84. A pair of bevel faced wheel flanges 88 are slidably keyed on the shaft 84 while a second pair of bevel faced wheel flanges 90 are slidably keyed on the shaft 86. The pairs of bevel faced wheel flanges cooperate to provide V-pulleys. A V-belt or other drive band 92 is trained around the resulting V-pulleys to drive the shaft 86 from the shaft 84.

Link arms 94 are pivotally supported intermediate their ends in the housing 82, as at 95, and are pivoted to the aligned wheel flanges 88 and 90 of each pair. The pivot point for each link arm 94 is between each pair of wheel flanges. The free ends 97 of the link arms 94 are pivoted to bosses 96 which are threaded onto a control rod 98 having right and left handed threaded portions 100 and 102 respectively receiving the bosses 96 thereon. A hand wheel 104 is secured on the rod 98 on the outside of the speed changer housing 82 as shown in Figure 1, so that the speed chamber can be adjusted from outside of the housing. Rotation of the hand wheel 104 in one direction will draw the beveled wheel flanges 88 toward each other while separating the wheel flanges 90, thereby causing the belt 92 to ride further inwardly from the periphery of the wheel flanges 88 than from the peripheries of the wheel flanges 90. As a result, the shaft 86 will be rotated at a slower speed than the shaft 84. Rotation of hand wheel 104 in the opposite direction will produce an opposite effect. In this manner the speed of the shaft 86 can be regulated relative to the speed of the shaft 84.

The shaft 84 is driven by a sprocket gear 106 which is connected by a suitable sprocket chain 108 to an equal diameter sprocket gear 110 which is keyed to the main line shaft 10. It is therefore apparent that the speed changing unit operates on the high speed side of the drive unit and accordingly the wheel flanges 88 and 90 and the belt 92 may be made relatively small, inasmuch as their torque requirements are a minimum. The output shaft 86 of the speed changing unit drives a pinion 111 which in turn drives a larger gear 113 and the large gear 113 in turn drives a sprocket pinion 115. A sprocket chain 117 connects sprocket pinion 115 to the speed control driving gear 42 of the differential drive unit 30 and effects a further reduction in speed. In the particular example illustrated, the speed control drive gear 42 is rotated from 10 to 40 R. P. M. depending upon the particular setting of the speed change hand wheel 104. Such range of speed variation will produce a corresponding variation in speed of driven shaft 26 of the differential drive unit 30 and hence control the speed of the rotating section of the paper machine which is driven by the drive unit. Accordingly, convenient adjustment of the relative speeds of the various rotating sections of the paper machine may be obtained to maintain proper draw between such sections.

In a modification of this invention illustrated in Figures 8 and 9, the speed control drive gear 42 of the differential drive unit 30 is driven through a reduction gear unit 112 by an electric motor 114. Reduction gear unit 112 and motor 114 may be conveniently mounted on the top wall of main housing 2. Referring to Figure 9, a novel speed control circuit for the motor 114 is provided in accordance with this invention to insure proper speed correlation of the output shaft of the drive unit with respect to the speed of the main line shaft. A generator 116 is provided which may be located at any convenient point along the machine and driven from main line shaft 10 by a belt 118. Motor 114 is energized directly by generator 116 and generator 116 may also be utilized to energize the motors of the additional drive units provided for the other rotating sections of the paper machine.

Field excitation for both the motor field 115 and the generator field 117 s provided from a D. C. bus 120 which will provide a substantially constant voltage. Speed control of the motor 114 is accomplished by a manually operable variable resistor 122 which is inserted in series relation in the field circuit of the motor 114.

From the construction described, it is apparent that the speed of motor 114 will maintain a constant relationship with the speed of line shaft 10 for any one setting of the speed control variable resistor 122. Hence for each variation in speed of line shaft 10 that might occur, a corresponding and compensating variation in the speed of motor 114 is produced which, when translated through the differential drive unit 30, will produce a compensating variation in speed of the output shaft of the drive unit and thus maintains the same draw between the various rotating sections of the paper machine. In addition, operation of variable resistor 122 permits the output speed of the drive unit to be conveniently manually varied to permit adjustment of the draw between the various rotating sections of the machine. In the particular example illustrated, the motor 114 is preferably of type having a speed range from 900 to 1200 R. P. M. produced by operation of variable resistor 122 and the speed reduction gearing 112 is designed so as to convert such speed variation of the motor 114 into a variation of speed control drive gear 42 of from 10 to 40 R. P. M.

Both modifications of this invention utilize to the fullest extent the advantages of the differential drive unit 30 which were pointed out in detail in my above referred to prior patent. The differential drive unit 30 acts as a speed reducer without the necessity for a heavy worm and wheel drive or other strong gear reduction drive capable of transmitting heavy loads. The arrangement cuts down on the number of gears and heavy working parts heretofore required for speed reducers.

Figure 2:
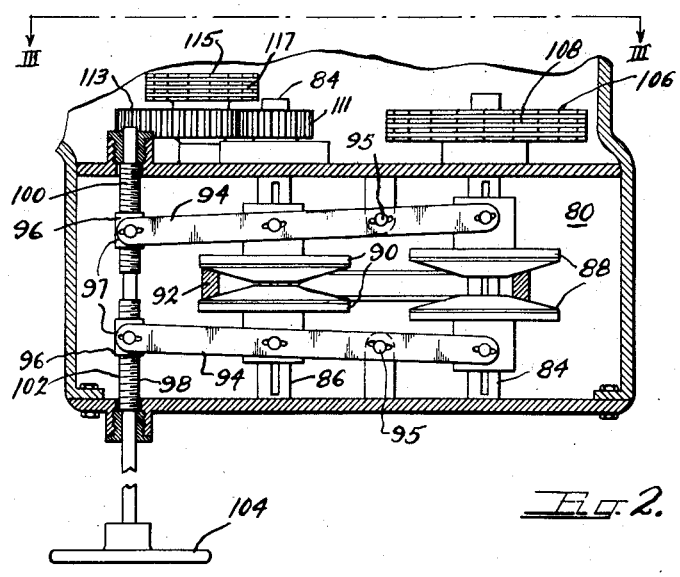
Figure 2 is a partial sectional view taken along the plane II—II of Figure 1.
Figure 3:
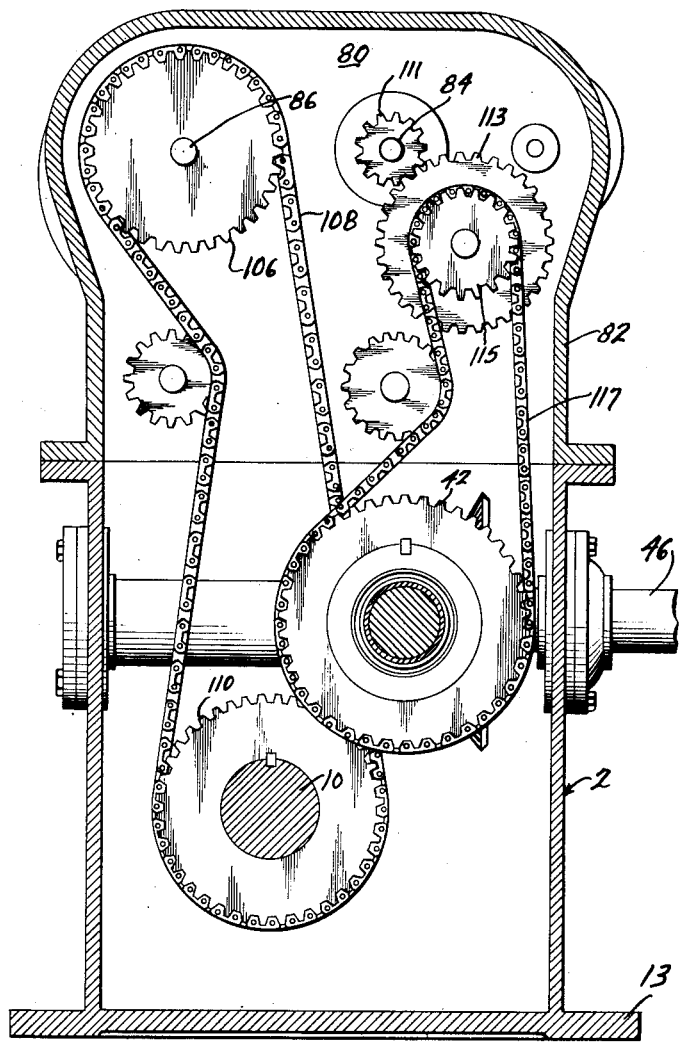
Figure 3 is a vertical sectional view taken along the plane III—III of Figure 2.
Figure 4:
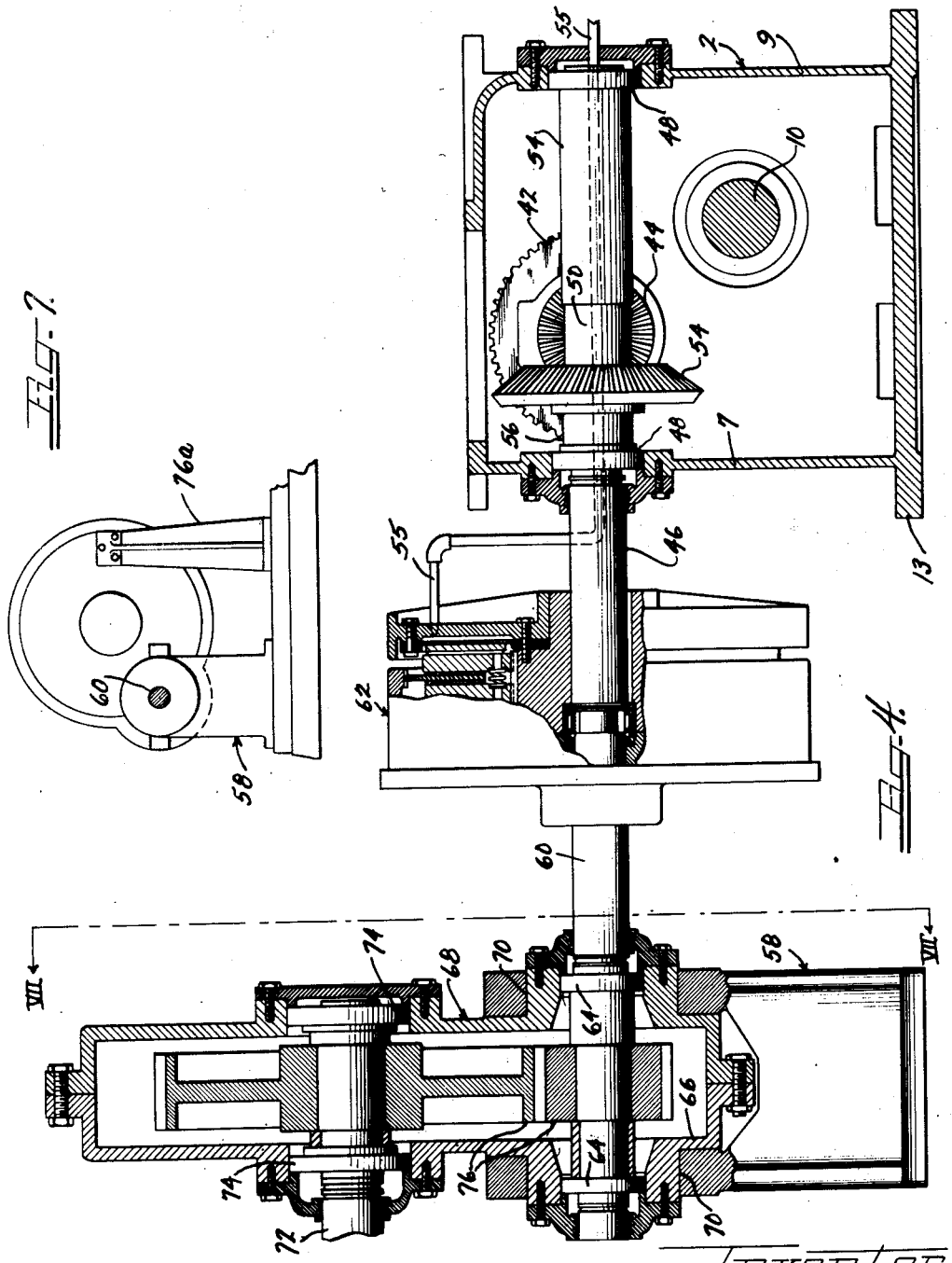
Figure 4 is a view similar to Figure 1 but is partly in vertical section with parts omitted for clarity, showing the arrangement of the differential having clutch and swing gear which are common to both modifications of this invention.

In addition to its function as a speed reducer, the differential unit serves the additional function of producing controlled differences in speeds so that the power delivery shaft may be driven at a selected speed relative to the line shaft 10 as determined by either the speed changing unit 80 in the modification of Figures 1 to 3 or as determined by the speed of the motor 114 in the modification of Figures 8 and 9.

As is pointed out in my prior patent, such differential arrangement has the further advantage of causing the line shaft 10 to supply 90% or more of the total power required by the rotating section and hence the speed controlling mechanism need only supply 10% or less of the total power. Such an arrangement obviously permits the size of the components forming the speed controlling mechanism to be maintained at a minimum.

In installing the units of this invention on a paper making machine, one unit is mounted at the rear side of the machine adjacent each in-shaft to the machine. The line shaft then passes through all the units and the units are selectively operated through their fluid control clutches at adjustable speeds determined by manual manipulation of the speed controlling mechanism, i. e., either the hand wheel 104 or the variable resistor 122 according to which modification of the invention is utilized.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a paper making machine having a plurality of relatively low speed rotating sections and a high speed main line shaft, the improvements of a take-off drive for one of said rotating sections comprising a housing adapted to journal a portion of said line shaft, a differential having first and second driving sides and a driven shaft, means connecting said line shaft with the first side of the differential to drive said first side at substantially the same speed as said line shaft, a controlled speed motor, means connecting said motor with the second side of the differential, whereby the speed of said motor determines the speed of said driven shaft, a power transfer shaft projecting out of said housing, means connecting said driven shaft with said power transfer shaft to drive said power transfer shaft at a speed materially less than that of said line shaft, a frame disposed adjacent said one rotating section journaling an input shaft, a secondary frame swingable on said main frame about a pivot, a power delivery shaft rotatably carried by said secondary frame and rotatable about an axis radially offset from the pivot, a standard for supporting said secondary frame at a pivotal position wherein said power delivery shaft is engageable with said one rotating section, speed reducing means carried by said main and secondary frames for transmitting power from said input shaft to said power delivery shaft with the delivery shaft being driven thereby at a speed materially less than that of said input shaft, and a clutch connecting said input shaft and the projecting end of said power transfer shaft, whereby said clutch is operated at a speed materially less than that of said line shaft and at a torque materially less than that of said delivery shaft and is accessible for repair without disturbing said line shaft or said one rotating section.

2. In a paper making machine having a relatively low speed rotating section and a high speed main line shaft, the improvement of a take-off drive for said rotating section comprising a housing adapted to journal a portion of said line shaft, a driven shaft also journaled in said housing, gearing means in said housing for driving said driven shaft at a rotational speed materially less than that of said line shaft, a power delivery shaft for said rotating section, a housing journaling said delivery shaft, an input shaft also journaled by said delivery shaft housing, gearing means in said delivery shaft housing connecting said input shaft and said delivery shaft to drive said delivery shaft at a rotational speed materially lower than that of said input shaft, and a clutch connecting said driven shaft and said input shaft for operation at a torque and speed intermediate those of said line shaft and said delivery shaft, whereby optimum clutch performance is obtained by the location of said clutch so that it operates at neither the extreme speed of said line shaft nor the extreme torque of said delivery shaft.

3. In a paper making machine having a line shaft journaled in a housing and a power delivery shaft also journaled in a housing and adapted for connection to a rotating section of said machine, means for coupling said line shaft and said delivery shaft including an output shaft journaled in said line shaft housing, gear means connecting said line shaft and said output shaft for driving said output shaft at a materially lower rotational speed than that of said line shaft, an input shaft journaled in the delivery shaft housing, gear means connecting said input shaft and said delivery shaft for driving said delivery shaft at a materially lower rotational speed than that of said input shaft, and clutch means coupling said input shaft and said output shaft, said clutch means operating at a speed and torque intermediate those of said line shaft and said delivery shaft, whereby optimum clutch performance is obtained due to the operation of said clutch at a speed materially less than that of said line shaft and at a torque materially less than that of said delivery shaft.

LLOYD HORNBOSTEL.

REFERENCES CITED

The following references are of record in the file of this patent:

UNITED STATES PATENTS

| Number | Name | Date |
|---|---|---|
| 502,557 | Doolittle | Aug. 1, 1893 |
| 968,290 | Thomas | Aug. 23, 1910 |
| 1,530,967 | Williams | Mar. 24, 1925 |
| 1,641,698 | Shaw | Sept. 6, 1927 |
| 1,667,718 | Connell | May 1, 1928 |
| 1,708,270 | Henderson | Apr. 9, 1929 |
| 1,723,231 | Ellsworth | Aug. 6, 1929 |
| 1,784,545 | Schiebuhr | Dec. 9, 1930 |
| 1,870,076 | Thomson | Aug. 2, 1932 |
| 1,946,839 | Cole | Feb. 13, 1934 |
| 2,000,465 | Higley | May 7, 1935 |
| 2,025,523 | Neuand | Dec. 24, 1935 |
| 2,106,472 | Aikman | Jan. 25, 1938 |
| 2,392,149 | Hornbostel | Jan. 1, 1946 |

FOREIGN PATENTS

| Number | Country | Date |
|---|---|---|
| 558,334 | France | May 23, 1923 |